Feb. 9, 1932.  L. W. CHUBB  1,844,840
VEHICLE LIGHTING SYSTEM
Filed Aug. 11, 1928

INVENTOR.
Lewis Warrington Chubb.
BY
Jesse P. Langley
ATTORNEY.

Patented Feb. 9, 1932

1,844,840

UNITED STATES PATENT OFFICE

LEWIS WARRINGTON CHUBB, OF EDGEWOOD, PENNSYLVANIA

VEHICLE LIGHTING SYSTEM

Application filed August 11, 1928. Serial No. 299,003.

My invention relates to vehicle lighting systems and particularly to the lighting systems of automobiles.

The subject matter of the present application is closely related to that of my copending application, Serial No. 399,713, filed July 29, 1920, of which application this is a continuation in part.

My invention has for one of its objects the prevention of blinding glare to drivers of approaching vehicles or to other individuals while providing abundant illumination of the roadway.

A further object of my invention is to eliminate the danger incident to the high power illumination of the headlights of vehicles by reason of its effect upon the eyes of drivers of other vehicles.

The dangers of operating motor vehicles or railroad trains when temporarily blinded by the glare of the lights of approaching vehicles or trains, are well known. Many regulations have been made in attempts to eliminate the effects of brilliant headlights. Such regulations have either been ineffective or have resulted in the almost equally dangerous condition of insufficient illumination of the road ahead.

It is well known, also, that the drivers of automobiles and railway locomotives must employ a strong headlight at night in order that the roadway may be clearly visible for a considerable distance ahead. A person facing such headlight is blinded because of the contraction of the iris of the eye. He is, accordingly, unable to see objects in, or nearly in, the direction of the light. The use of dimmers, diffusing lenses or other devices has proven unsatisfactory in that the degree of illumination is below that necessary for safe operation.

According to my invention, I provide a system of lighting which insures proper illumination of the roadway, but provides means whereby the usual glare of an approaching vehicle is avoided. Broadly considered, my invention consists in employing light of certain characteristics and in providing protective means for observing the roadway that is opaque to the direct light of an approaching vehicle but is transparent to the reflected light of the driver's vehicle or to that of a vehicle going in the same direction.

This selective effect may be secured in several ways. The lights of vehicles may correspond in color to their direction of travel. Absorbing color screens may be used to protect against the lights of approaching vehicles.

Figure 1:
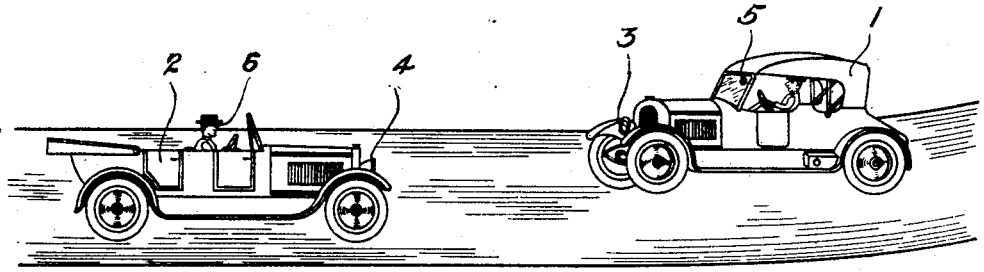
Figure 2:
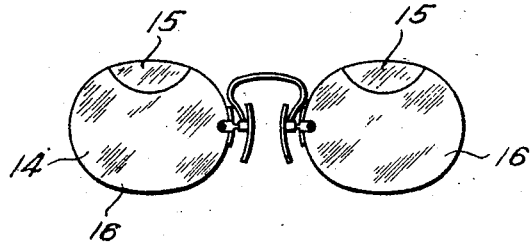
Figure 3:
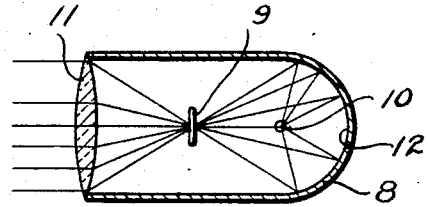

The details of my invention will be described in connection with the accompanying drawings in which, Figure 1 is a diagrammatic view of my invention as applied to automobiles, Fig. 2 is a front view of a pair of eye glasses only a portion of each of the lenses of which are provided with an absorbing color screen, Fig. 3 is a sectional view of a vehicle lamp in which a small color screen may be employed, the paths of certain of the light rays being shown.

The operation of my system may be understood by reference to Fig. 1. It may be assumed that two automobiles 1 and 2 are approaching each other at night and that the vehicles are respectively provided with headlights 3 and 4 for providing light of different characteristics. The automobile 1 is provided with a screen 5 located on the windshield that is capable of absorbing the light from the headlights 4 of the other automobile. The driver of the automobile 2 is provided with spectacles or goggles 6, which similarly protect him from headlights 3.

It may be assumed that the arrangement referred to above is one in which the lights are of different colors. For example, the color of the headlights 4 is yellow while that of the headlights 3 is a mixture of red and green. The goggles 6 should in such case be yellow in color and be capable of absorbing all the red and green light. Conversely the screen 5 should absorb yellow light and transmit red and green light. It will be obvious that by means of a system of this character each driver may enjoy the full illuminating effect of his own lights and at the same time be free from the glare of vehicles traveling in the opposite direction.

When color combinations are employed in the manner described above, it will be obvious that traffic regulations are necessary to insure that vehicle lights conform to the prescribed colors for each direction of travel. It is necessary also to provide means whereby the colors of the lights and the absorbing screens may be changed with the direction of travel.

Such changes may be made by suitable means controlled by the driver or it is conceivable that such changes might be accomplished automatically as by means of a compass in the manner shown and described in British Patent No. 236,562, Jan. 3, 1927. In my copending application referred to above, polarized light is employed and change in characteristics occurs automatically with a change in direction relative to an observer by reason of the particular angle chosen for the plane of polarization.

Color screens may be applied in various ways, such for example, as to the usual lenses of headlights for automobiles.

The lamp 8 shown in Fig. 3 may be employed by interposing a small color screen 9 between a light source 10 and the lens 11. Light is focused by the reflector 12 of the elliptical lamp 8 and passes through the color screen 9. The divergent rays are then refracted by the lens 11 into substantially rays of colored light. In this form of lamp, I may provide two color screens that may be selectively actuated into and out of position, as by the means employed in the aforesaid British patent.

The analyzer or absorber may take various forms such as a small area on the windshield, goggles, or eye-glasses and it must be capable of absorbing the light of an approaching automobile.

A bi-vision glass, such as the glass 14 of Fig. 2 may be easily adapted for use in this connection. It consists of a color screen 15 attached to the upper portion of each of the lenses 16, the outer surfaces being ground to the optical prescription of the wearer and they may thus serve a double purpose.

The driver will instinctively bow his head when a strong light approaches and will observe the road through the color screen 15 without experiencing any glare of the colored light.

Absorbers may also take the form of detachable or skeleton sets or goggles for persons who do not normally wear glasses.

It will be appreciated that the employment of a system of the character described permits the employment of lamps of relatively high candle power without the necessity of using dimmers or diffusing devices which render the roadway obscure when passing other vehicles. At such times it is especially necessary to have a clear view of the roadway and of the approaching vehicles in order that they may pass safely. The evil effects of blinding glare are entirely eliminated by the system of my invention.

While I have shown and described my invention as adapted to automobiles it may be employed with equal and possibly greater advantage to railway systems since trains travel comparatively long distances without changes in direction and conventions adopted for different directions of travel may easily be observed.

I claim as my invention:

1. The headlight apparatus for automobiles on other vehicles comprising a headlight provided with an emission device to form a beam of light transmitted ahead of the vehicle and having a definite color characteristic and a light viewing device adapted to be mounted adjacent the eyes of the driver of the vehicle, said device being operable to transmit light of said color characteristic and to substantially cut off light having other than said color characteristic to thereby eliminate the objectionable headlight glare of a differently equipped approaching vehicle.

2. The method of lighting motor vehicles comprising projecting from such a vehicle light having a predominant color characteristic and protecting the driver's eyes from light having other predominant characteristics while predominantly admitting said projected light to his eyes.

3. Means for lighting motor vehicles comprising means for projecting from said vehicle light having a predominant wave length characteristic and means for protecting the driver's eyes from light having other characteristics while predominantly admitting said projected light to his eyes.

4. A vehicle lighting system comprising means for projecting from said vehicle light having certain color characteristics and means for protecting the driver's eyes by selectively absorbing light of different characteristics from approaching vehicles but transmitting said projecting light.

5. A vehicle lighting system comprising means for projecting from approaching vehicles light having different color characteristics and means for protecting the eyes of the drivers of said vehicles by selectively transmitting only light having the same color characteristics as that of the light from their respective vehicles and absorbing light having other characteristics.

6. A vehicle lighting system comprising means for projecting therefrom light having a certain color characteristic and means for protecting the eyes of the driver thereof comprising a device for transmitting only such light as conforms to such color characteristic and for excluding light having other color characteristics.

7. A vehicle lighting system embodying means for projecting therefrom light having a certain color characteristic and a protective device for the operator of the vehicle which excludes light from approaching vehicles having different color characteristics and admits only light having color characteristics substantially similar to that of the projected light whereby the driver may observe the field illumined by the projected light of his vehicle.

8. A headlight system for vehicles having means for preventing glare comprising means for projecting from a vehicle light of a certain color characteristic and a protective device for the driver comprising means for selectively transmitting only light of said certain color characteristic through which the field illumined by the projected light may be observed.

In testimony whereof, I have hereunto subscribed my name this 10th day of August, 1928.

LEWIS WARRINGTON CHUBB.